(12) United States Patent
Schilling et al.

(10) Patent No.: US 7,580,043 B2
(45) Date of Patent: Aug. 25, 2009

(54) METHOD FOR ADDING DETAIL TO A TEXTURE MAP

(75) Inventors: Andreas Schilling, Gomaringen (DE); Guenter Knittel, Tuebingen (DE)

(73) Assignee: Via Technologies, Inc., Hsin-Tien, Taipei (TW)

( * ) Notice: Subject to any disclaimer, the term of this patent is extended or adjusted under 35 U.S.C. 154(b) by 0 days.

(21) Appl. No.: 11/507,071

(22) Filed: Aug. 18, 2006

(65) Prior Publication Data
US 2007/0070078 A1  Mar. 29, 2007

Related U.S. Application Data

(62) Division of application No. 09/708,797, filed on Nov. 7, 2000, now abandoned, which is a division of application No. 08/884,044, filed on Jun. 27, 1997, now Pat. No. 6,236,405.

(60) Provisional application No. 60/020,935, filed on Jul. 1, 1996.

(51) Int. Cl.
*G06T 11/40* (2006.01)
(52) U.S. Cl. .................................................. 345/587
(58) Field of Classification Search ................. 345/587
See application file for complete search history.

(56) References Cited

U.S. PATENT DOCUMENTS

| | | | |
|---|---|---|---|
| 4,580,134 A | 4/1986 | Campbell et al. | |
| 5,019,908 A | 5/1991 | Su | |
| 5,222,205 A * | 6/1993 | Larson et al. ............... | 345/587 |
| 5,461,712 A | 10/1995 | Chelstowski et al. | |
| 5,606,650 A | 2/1997 | Kelley et al. | |
| 5,651,104 A | 7/1997 | Cosman | |
| 5,760,783 A * | 6/1998 | Migdal et al. ............... | 345/587 |
| 5,831,624 A | 11/1998 | Tarolli et al. | |
| 5,903,276 A | 5/1999 | Shiraishi | |
| 6,236,405 B1 | 5/2001 | Schilling et al. | |
| 6,262,740 B1 | 7/2001 | Lauer et al. | |
| 6,292,194 B1 * | 9/2001 | Powell, III ................... | 345/582 |
| 6,304,268 B1 * | 10/2001 | Iourcha et al. .............. | 345/428 |
| 6,339,428 B1 | 1/2002 | Fowler et al. | |

(Continued)

OTHER PUBLICATIONS

Chen, M. et al., Grammy: High Performance Graphics Using Graphics Memories, Jul. 3-4, 1995, Wilhelm-Schickard-Institut, Graphisch-Interaktive Systeme, University of Tubingen, Germany, pp. 33-48.*

(Continued)

*Primary Examiner*—Jeffery A Brier
(74) *Attorney, Agent, or Firm*—Thomas, Kayden, Horstemeyer & Risley

(57) ABSTRACT

A method and apparatus for mapping a texture to a surface of a computer generated object dependent upon the geometric shape of the object. The method includes the steps of approximating a true pixel color by performing a number of texturing operations and averaging the results of the texturing operations. The apparatus including a texturing unit comprising a control unit for determining a set of N footprint textel locations, a RAM for determining N sets of textel values with each set of textel values being associated with one footprint textel location, an interpolator for interpolating the N sets of textel values for each textel location, and an averaging unit for determining an average value from the interpolated values for each textel location.

5 Claims, 11 Drawing Sheets

U.S. PATENT DOCUMENTS 6,452,602 B1     9/2002     Morein

OTHER PUBLICATIONS

Andreas Schilling, Gunter Knittel, and Wolfgang Strasser, Texram: A Smart Memory for Texturing, May 1996, IEEE Computer Graphics and Applications, vol. 16, issue 3, pp. 32-41.*

Campbell, G. et al., "Two Bit/Pixel Full Color Encoding", ACM Siggraph, vol. 20, No. 4, pp. 215-223 (Aug. 18-22, 1986).

Crow, F., "Summed-Area Tables for Texture Mapping", Computer Graphics, vol. 18, No. 3, pp. 207-212 (Jul. 1984).

Deering, M. et al., "FBRAM: A New Form of Memory Optimized for 3D Graphics", Computer Graphics Proceedings, Annual Conference Series, pp. 167-174 (1994).

Glassner, A., "Adaptive Precision in Texture Mapping", ACM Siggraph, vol. 20, No. 4, pp. 297-306 (Aug. 18-22, 1986).

Heckbert, P., "Color Image Quantization for Frame Buffer Display", Computer Graphics, vol. 16, No. 3, pp. 297-307 (Jul. 1982).

Straber, W., et al., "High Performance Graphics Architectures", Graphicon '95, Wilhelm-Schickard-Institut, Graphisch-Interaktive Systeme, University of Tubingen, Germany, pp. 114-121.

Williams, L., "Pyramidal Parametrics", Computer Graphics, vol. 17, No. 3, pp. 1-11 (Jul. 1983).

* cited by examiner

METHOD FOR ADDING DETAIL TO A TEXTURE MAP

CROSS-REFERENCE TO RELATED APPLICATIONS

This application is a divisional and claims the priority benefit of U.S. patent application Ser. No. 09/708,797 filed Nov. 7, 2000, now abandoned which is a divisional and claims the priority benefit of U.S. patent application Ser. No. 08/884,044 filed on Jun. 27, 1997, which is now U.S. Pat. No. 6,236,405, which claims the priority benefit of U.S. provisional patent application No. 60/020,935 filed Jul. 1, 1996. The disclosure of the aforementioned applications is incorporated herein by reference.

FIELD OF THE INVENTION

This invention relates generally to the field of computer graphics and more particularly to the generation and processing of textures in computerized graphical images.

BACKGROUND OF THE INVENTION

Mapping textures onto surfaces of computer-generated objects is a technique which greatly improves the realism of their appearance. For instance, many surfaces are characterized by surface roughness which in a digitized image manifests itself in the form of local variations in brightness from one pixel to the next. Unfortunately, altering pixels in computer generated images to generate surface textures in such images imposes high computational demands and, even worse, tremendous memory bandwidth requirements on the graphics system. Tight cost constraints imposed upon the design of most products in conjunction with ever increasing user expectations make the design of a powerful texture mapping unit a difficult task.

In the present specification, we use the term "texture" as a synonym for any image or structure to be mapped onto an object, unless explicitly stated otherwise. During the rasterization process, mapping images (textures) onto objects can be considered as the problem of determining a screen pixel's projection on the image (referred to herein as the pixel's "footprint") and computing an average value which best approximates the correct pixel color. In real-time environments, where several tens of millions of pixels per second are issued by fast rasterizing units, hardware expenses for image mapping become substantial and algorithms must therefore be chosen and adapted very carefully.

One approach is to create a set of prefiltered images, which are selected according to the level of detail (the size of the footprint), and used to interpolate the final pixel color. The most common method is to organize these maps as a mipmap as proposed by L. Williams, "*Pyramidal Parametrics*", Proceedings of SIGGRAPH '83, Computer Graphics, vol. 17, no. 3, July 1983, pp. 1-11. In a mipmap, the original image is denoted as level 0. In level 1, each entry holds an averaged value and represents the area of 2×2 texels. As used herein the term "texel" (texture element) refers to a picture element (pixel) of the texture. This is continued until the top-level is reached, which has only one entry holding the average color of the entire texture. Thus, in a square mipmap, level n has one fourth the size of level n−1.

Mipmapping in a traditional implementation either requires a parallel memory system or sequential accesses to the texture buffer and is therefore either expensive or slow. One way to reduce data traffic is image compression. Its application to texture mapping, however, is difficult since the decompression must be done at pixel frequency.

There is accordingly a need for a texture mapping system which implements mipmapping in a rapid and/or a cost efficient manner. There is a further need for a texture mapping system which provides significant image enhancement at high rendering speeds. Moreover, particularly with respect to systems where cost is of concern, there is a need for an efficient compression scheme which reduces the amount of data required to be stored and accessed by a texture mapping system.

SUMMARY

Embodiments of the present invention advantageously enhance computer generated images by texture mapping in a rapid and efficient manner. In a principle aspect, the present invention advantageously provides a footprint assembly system which provides significant image enhancement at high rendering speeds. Embodiments employing the principles of the footprint assembly system described herein advantageously provide significant image enhancement in an efficient manner by approximating the projection of a pixel on a texture by a number N of square mipmapped texels.

In another aspect, the present invention provides a data compression system to reduce memory storage and bandwidth requirements in a simple, yet fast manner, and to therefore reduce system costs. Still other aspects of the present invention provide novel hardware architectures for texture mapping. In one embodiment, a hardware texturing unit is provided to operate on compressed textures. In certain embodiments the textures may be compressed by way of the aforementioned novel compression system. Such an embodiment advantageously decreases system cost by reducing the amount of memory storage and bandwidth required to store texture maps. In a second embodiment, a hardware texturing unit is provided to operate on uncompressed textures. Such a unit advantageously incorporates certain interpolation techniques to provide high image quality in systems where high image quality is required.

The hardware units described herein benefit from the integration of arithmetic units and large memory arrays on the same chip. This allows exploitation of the enormous transfer rates internal to a chip and provides an elegant solution to the memory access bottleneck of high-quality texture mapping. In addition to achieving higher texturing speed at lower system costs, such hardware units incorporate new functionality such as detail mapping and footprint assembly to produce higher quality images at still real-time rendering speed. Other functions which may be integrated into certain units include environment and video mapping. Such hardware units may consequently take the form of extremely versatile texturing coprocessors.

These and other features and advantages of the present invention may be better understood by considering the following detailed description of certain preferred embodiments. In the course of this description, reference will frequently be made to the attached drawings.

DETAILED DESCRIPTION

1. Overview

The following detailed description starts with an explanation in section 2 of mipmapping. Section 3 provides an explanation of a preferred compression scheme for reduction of data storage and bandwidth requirements. Section 4 provides a description of a hardware unit for texture mapping which is particularly well suited to low cost systems. Section 5 describes details of a hardware texture mapping unit, referred to as TEXRAM, which is particularly well suited for applications where high image quality is at a premium. Section 6 describes four different configurations of the TEXRAM chip for texture mapping. Sections 7, 8 and 9 describe respectively, environment mapping, reflectance mapping and detail maps, which are additional functions which may be performed by the TEXRAM chip. Finally, section 10 describes a footprint assembly system which efficiently provides significant image enhancement in a number of texture mapping architectures including those described in sections 4 and 5 herein.

2. Mipmapping

Figure 1:
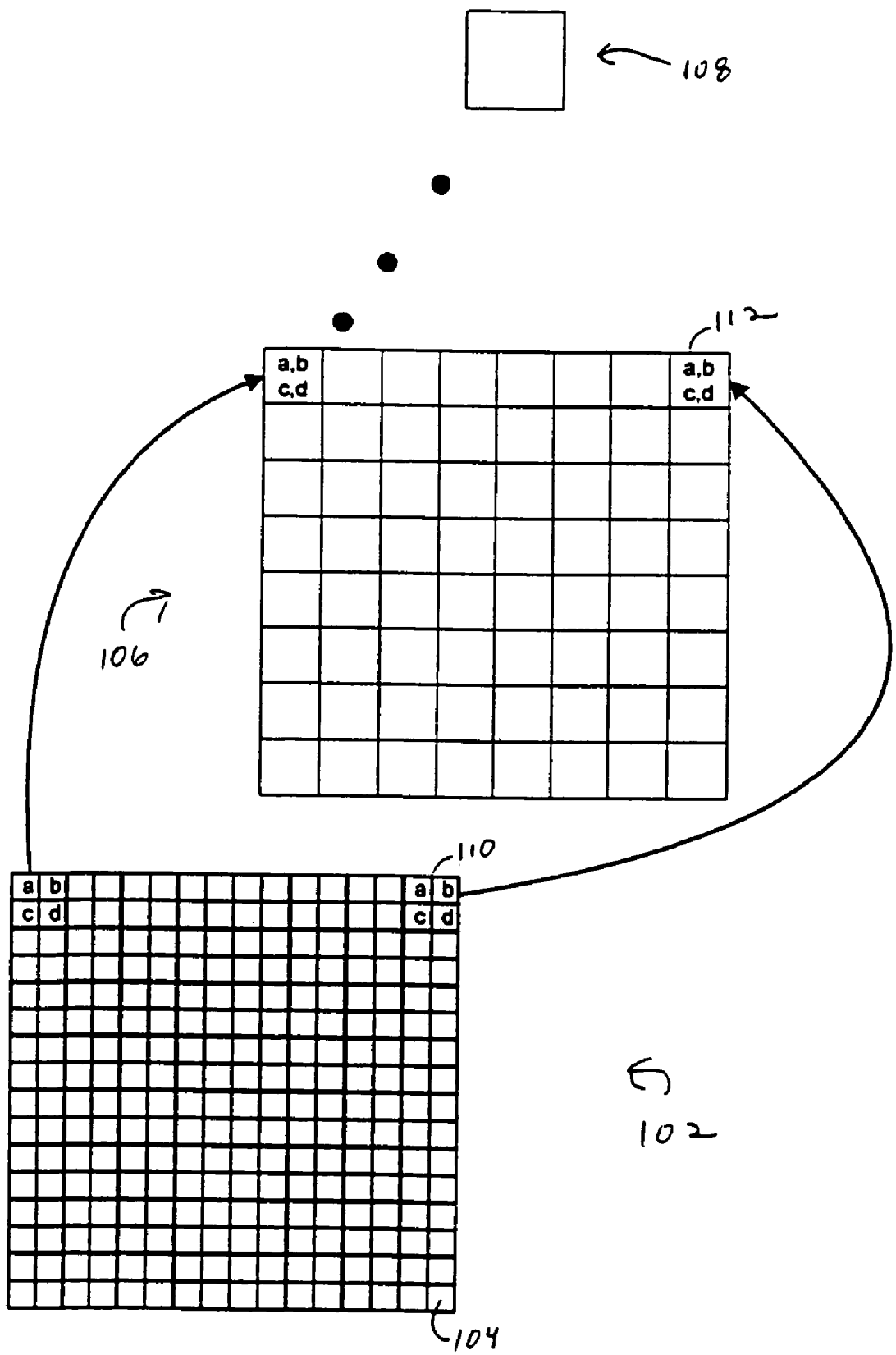
FIG. 1 is a high-level illustration of the principles of mipmapping.

As noted above in the "Background" portion, use of mipmaps to organize a set of prefiltered images for use in texture mapping was proposed by L. Williams, "*Pyramidal Parametrics*", Proceedings of SIGGRAPH '83, Computer Graphics, vol. 17, no. 3, July 1983, pp. 1-11. FIG. 1 of the drawings shows a schematic representation of a mipmap. In a mipmap, the original image 102 which is comprised of a plurality of texels, such as seen at 104, is denoted as level 0. In level 1, seen at 106, each entry holds an averaged value and represents the area of 2×2 texels of level 0. For example, in FIG. 1, texel 112 in level 1 holds an averaged value of the four texels seen at 110 in level 0 designated individually as "a", "b", "c", and "d". This is continued until the top-level 108 (level 4 in the example shown in FIG. 1) is reached, which has only one entry holding the average color of the entire texture. Thus, in a square mipmap, level n has one fourth the size of level n−1.

As used herein, the term "rasterizer" refers to a graphics engine which accepts vertex coordinates, together with associated color values, which define vertices of triangles used to model objects in a 3-dimensional space. Such a rasterizer renders the pixels within the triangles defined by the received coordinates and also interpolates the z-(depth) value and the color (RGB) value for each pixel coordinate generated. An example of such a rasterizer is the 3-dimensional graphics engine contained in the ViRGE line of graphics controllers sold by S3 Incorporated, Santa Clara, Calif.

Figure 2:
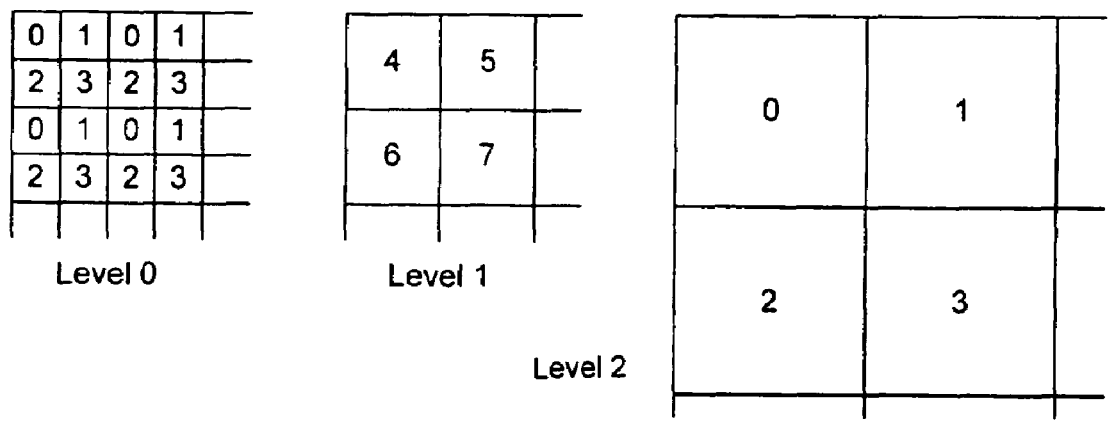
FIG. 2 is a high-level illustration of a preferred memory organization in a mipmapping system.

Mipmapping is a reasonable candidate for a hardware implementation due to its regular access function. If the memory is designed to deliver all eight texels for a tri-linear interpolation in a single access, texturing can potentially keep up with fast rasterizer units. This is accomplished by having eight independent memory banks and a conflict-free address distribution as shown in FIG. 2. As seen in FIG. 2, each 2×2 group of texels in Level 0 is assigned to memory banks 0, 1, 2 and 3 and each 2×2 group of texels in Level 1 is assigned to memory banks 4, 5, 6 and 7. Such an arrangement allows two mipmap levels to be retrieved in a single access. Furthermore, to reduce data traffic between the rasterizer unit and the texture system, all address calculations concerning the eight bank addresses as well as the tri-linear interpolation should be performed locally.

Figure 3:
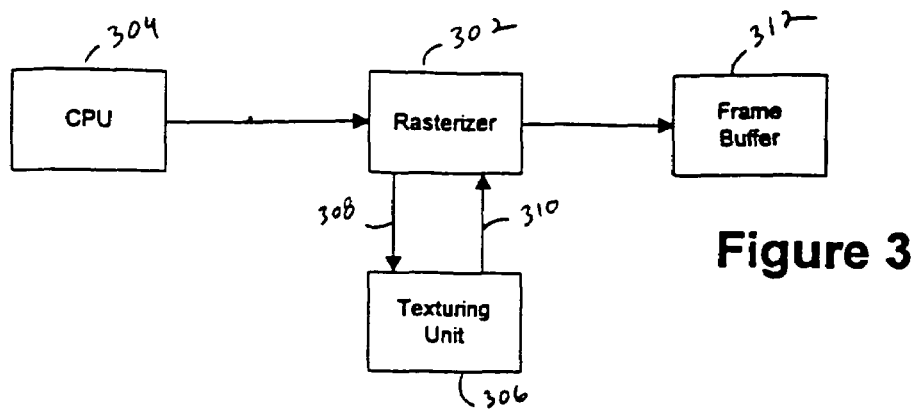
FIG. 3 is a schematic high level block diagram of a graphics controller with a texturing unit.

The ideal solution is a highly-integrated memory device which incorporates all needed arithmetic units for fast mipmapping. FIG. 3 shows a schematic block diagram of a 3-dimensional graphics system which incorporates a texture memory in accordance with the principles of the invention. In FIG. 3, rasterizer 302 receives data from CPU 304 in the form of three-dimensional coordinates (x,y,z) for each vertex of the triangles comprising a modeled object. Also received for each vertex are texture coordinates (u,v) which define the location of the vertex on the texture.

The rasterizer 302 computes texture coordinates (u,v) for each pixel. Texturing unit 306 receives the texture coordinates (u,v) of a pixel from rasterizer 302 over line 308 and retrieves a plurality of texels from the texture memory and interpolates the pixel's texture color (RGB) from the texel values. The term "line" as used herein is intended to refer generally to functional coupling of signals between logical blocks. As such the term "line" may refer to a single physical signal, or to a plurality of signals such as a bus. Rasterizer 302 receives the pixel's texture color from texturing unit 306 over line 310. The final pixel color (RGB) together with the z-value is stored in frame buffer 312 at address (x,y). Data stored in frame buffer 308 may be subsequently used by rasterizer 302 for further operations in addition to being converted to analog form for display on a visual display unit (not shown) such as a Cathode Ray Tube (CRT) or Liquid Crystal Display (LCD). A description of two preferred embodiments of texturing unit 306 is provided below in Sections 4 and 5.

Mipmapping in a traditional implementation either requires a parallel memory system or sequential accesses to the texture buffer and is therefore either expensive or slow. In Section 4 below, a hardware architecture for the processing of compressed textures is presented, which integrates texture mapping units together with a small texture cache on a chip. By means of this texture compression, the off-chip bandwidth for updating the on-chip cache is reduced, so that standard off-the-shelf DRAM devices can be used.

In Section 5 below, a hardware architecture based on the combination of arithmetical-logical units and large memory arrays for texture mapping is presented. Such units have also been shown to provide a quantum leap in performance in other areas such as the Z-Buffer. See, for example, M. F. Deering et al., "*FBRAM: A New Form of Memory Optimized for 3D Graphics*", Proceedings of SIGGRAPH '94, July 1994, pp. 167-74, and G. Knittel and A. Schilling, "*Eliminating the Z-Buffer Bottleneck*", Proceedings of the European Design and Test Conference, Paris, France, Mar. 6-9, 1995, pp. 12-16. A graphics pipeline based on enhanced memories for high performance in low-cost systems is described in a paper by G. Knittel, A. Schilling and W. Strasser, "*GRAMMY High Performance Graphics Using Graphics Memories*", in: High Performance Computing for Computer Graphics and Visualisation, Springer-Verlag, London, 1996.

An additional disadvantage of traditional mipmapping stems from the assumption of a square footprint. The hardware architectures presented in Sections 4 and 5 below efficiently alleviate the deficiencies arising from the square footprints by means of a new filtering operation (herein referred to as "footprint assembly" as described in Section 10 below). The filtering can take advantage of the extremely high bandwidth, which is available on-chip.

3. Compression

Compression of textures is often preferable as it saves memory costs and reduces memory bandwidth requirements. However, several requirements have to be fulfilled. The most important one is, that the local decompression of the stored texture is possible and can be performed very quickly. Commonly used image compression schemes such as JPEG, are not well suited to texture mapping since they do not fulfill two essential requirements for texture mapping: (1) the decompression has to be simple and very fast, and, (2) random access to texels must be possible.

Block Truncation Coding (BTC) was introduced by Delp et. al. in an article entitled "*Image Compression Using Block Truncation Coding*", IEEE Transactions on Communications, vol. COM-27, no. 9, September 1979, pp. 1335-42. Color Cell Compression (CCC) is an extremely useful image compression technique for texture mapping. CCC which is a modification and application of BTC to color images was introduced by G. Campbell et al. in an article entitled "*Two Bit/Pixel Full Color Encoding*", SIGGRAPH '86 Conference Proceedings, Computer Graphics, vol. 20, no. 4, August 1986, pp. 215-23.

Figure 4:
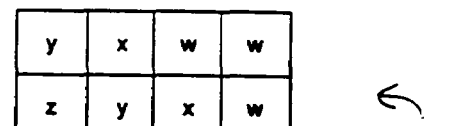
FIG. 4 is a high-level illustration showing the principles of a preferred compression system.
Figure 4:
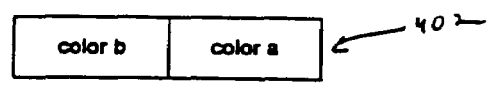
Figure 4:
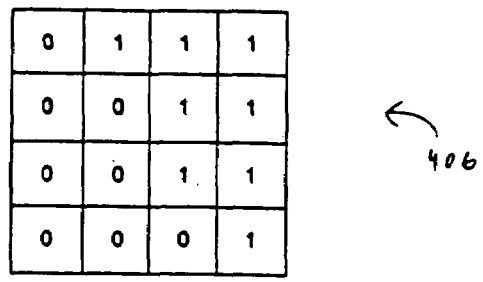

FIG. 4 shows the principle of the BTC/CCC. The main idea of BTC/CCC is to use a local 1-bit quantizer on 4×4 pixel blocks such as seen at 404. The compressed data for such a block thus consists of only two colors (seen at 402) and 16 bits (seen at 406 and hereafter referred to as "decision bits") that indicate, which one of the two colors is assigned to each of the 16 pixels. For example, as shown in FIG. 4, the four color values (w, x, y and z) seen at 404 are reduced to two color values (a,b) at 402, represented by 0 and 1, respectively at 406. For further data reduction, the 24-bit colors can be globally quantized to 8 bits, using a standard quantizer such as the Heckbert quantizer described by P. Heckbert, "*Color Image Quantization for Frame Buffer Display*", Proceedings of SIGGRAPH '82, Computer Graphics, vol. 16, no. 3, July 1982.

Figure 5:
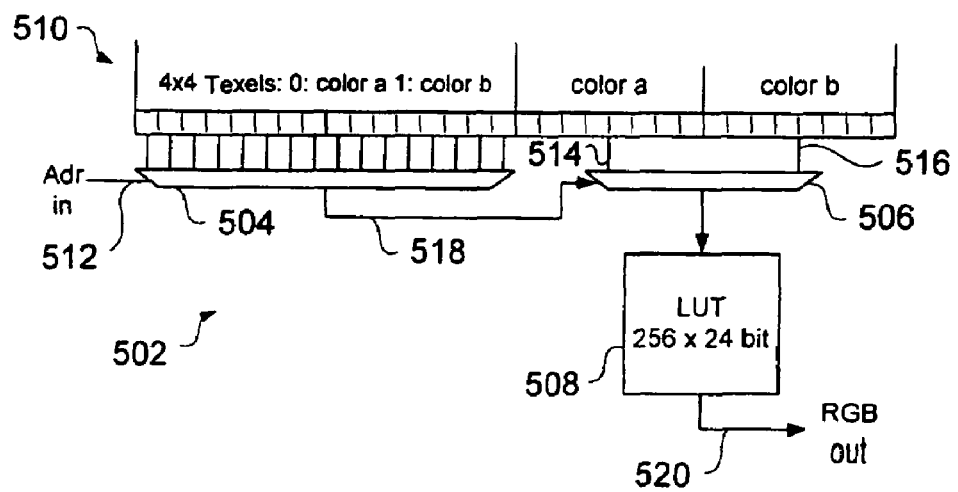
FIG. 5 is a schematic illustration of a preferred decoder employed in the decompression system of FIG. 3.

A preferred decoder for decoding of a CCC-encoded image is shown in FIG. 5. The decoder 502 consists of multiplexers 504 and 506 and a lookup table 508. A 32-bit quantity is stored in register 510. This 32-bit quantity consists of two 8-bit quantities of color data ("color a" and "color b", such as shown at 402 in FIG. 4), each 8-bit quantity representative of one of the two colors generated for the 16 pixel block 404. The other 16 bits stored in register 510 represent, individually, one of the 16 pixels shown at 404. Once a 16-texel-block (32 bits) is retrieved from memory and stored in register 510, the texel to be decompressed is selected by its 4-bit address 512 within the block. Multiplexer 504 feeds the corresponding decision bit via line 518 to the select-input of multiplexer 506, which passes one of the color quantities "a" or "b" to the address inputs of look-up table 508. In the embodiment of FIG. 5, look-up table 508 contains 256 locations addressable by the 8-bit input, each location storing a unique 24-bit color. The output of the decoder 502 is a 24-bit RGB output shown at 520. The decoder fulfills the listed requirements for texture mapping in a nearly ideal way.

The compression of the texture maps can and preferably should be performed in advance. This not only saves space on the storage media for the description of the scene, but also allows more complex algorithms to be used for the quantization due to the off-line compression. For grey scale images the first three sample moments can be preserved by choosing appropriate threshold and output levels as described by Delp et al. in the article referred to above. In the Campbell et al. article referred to above, only the luminance of the input colors is used for clustering. If there are different colors with similar luminance in the same block, this method will fail. The quantization with the minimum mean square error can only be found by exhaustive trial, resulting in long compression times.

For a quicker approximate solution, embodiments of the present invention advantageously split the input values into two clusters by a plane perpendicular to the axis with the minimum "moment of inertia". For that purpose the tensor of inertia from the individual colors $\vec{x}$ is calculated as $$\Theta_{ik} = \sum_{j=1}^{16} \vec{x}_j^2 \delta_{ik} - x_{ji} x_{jk}, \tag{1}$$

where i, k∈{R, G, B} and $\delta_{ik}$=1 for i=k, 0 else.

The eigenvector with the smallest eigenvalue is then calculated using standard methods. Multiplication of the individual colors with that eigenvector reduces the clustering problem to one dimension and allows the colors to be sorted according to their distance to a plane parallel to the cutting plane. The quantization threshold is set to the mean distance. In this way the mean color is in the cutting plane.

CCC in conjunction with footprint assembly (described in Section 10) gives better image quality at higher speed and lower cost than traditional texture mapping.

4. Texture Mapping Unit

Figure 6:
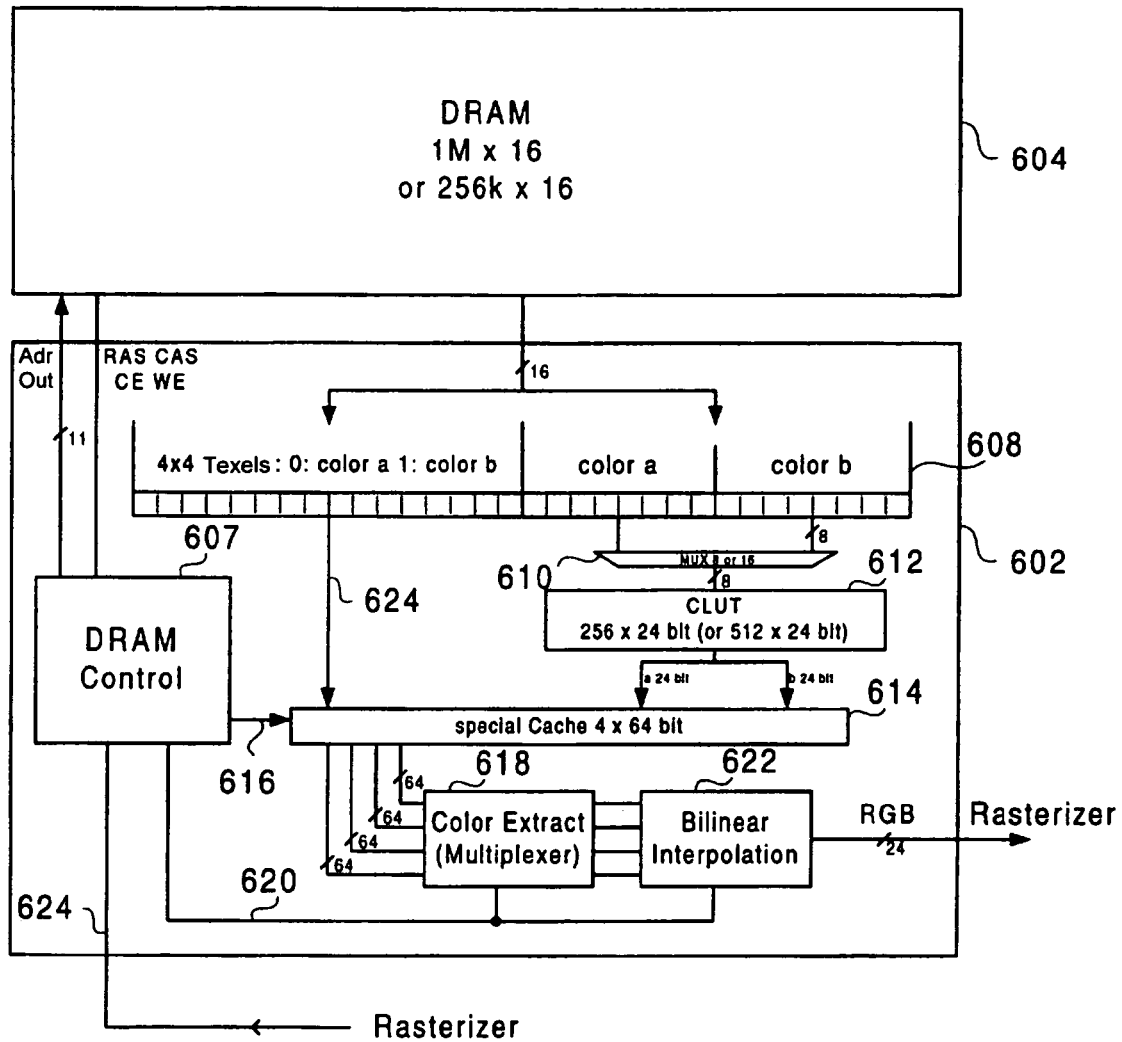
FIG. 6 is a schematic illustration of a texture mapping system which operates in accordance with the principles shown in FIG. 4.

FIG. 6 shows an embodiment of a single chip implementation of an integrated texture mapping unit 602 which operates in conjunction with a conventional Dynamic Random Access Memory (DRAM) 604. In a preferred embodiment, unit 602 and DRAM 604 are integrated on a single chip. The unit 602 receives data from a rasterizer 302 such as shown in FIG. 3. DRAM control unit 607 receives texture addresses from the rasterizer 302. Operation of the DRAM 604 is controlled by DRAM control unit 607, which generates memory addresses for the DRAM in accordance with the output of rasterizer 302 and which generates other signals required to operate the DRAM such as row and column address strobes and chip and write enable signals. In the embodiment of FIG.

6, DRAM 604 provides 32 bits of data, 16-bits at a time. One 16-bit quantity represents two, 8-bit quantities of color data, such as explained above in connection with FIGS. 4 and 5, and one 16-bit quantity represents 16 bits of decision data, such as also explained above in connection with FIGS. 4 and 5. The 32-bit quantity outputted by the DRAM 604 is stored in a register 608. Multiplexer 610 performs a 2:1 multiplexing function to sequentially select the two 8-bit color quantities stored in register 608 for output to Color Lookup Table (CLUT) 612. CLUT 612 may take a variety of configurations including 256×24 or 512×24, depending on the number of inputs. CLUT 612 outputs a 48-bit quantity to a cache 614. Preferably, the cache 614 is a small, four-entry cache of 32 bytes which is sufficient to store four 4×4 texel blocks or a total of 64 texels.

Figures 7, 10:
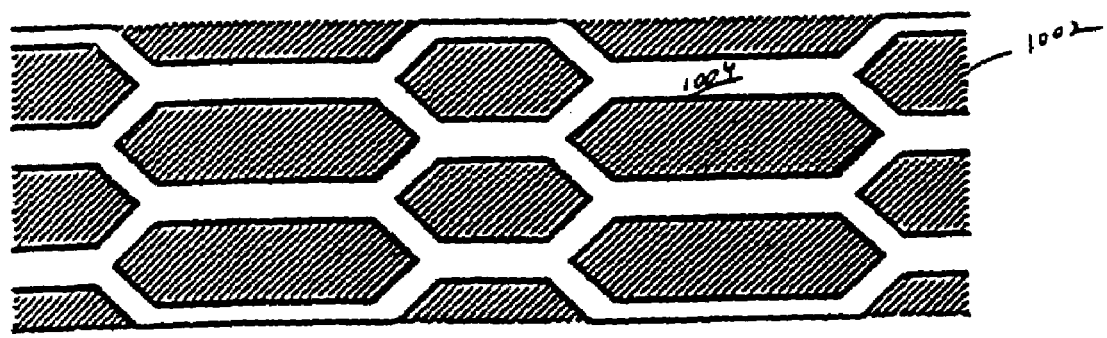
FIG. 7 is a schematic illustration of cache mapping for the system of FIG. 6.
FIG. 10 illustrates an image used in conjunction with the explanation of FIGS. 9(a) and 9(b)

The cache 614 is a direct mapped cache in which each memory address is assigned one unique cache cell (A through D) in an interleaved way as shown in FIG. 7. In FIG. 7, each block (A, B, C, or D) represents one entry in the cache 614. This unambiguous way of addressing allows a simple address calculation logic to be used. A simple form of address lookahead speeds up the operation of the cache: neighbors of the current block are preloaded if the DRAM interface is idle. The three neighbors adjacent to the quadrant of the point addressed by the current u- and v-values may be selected. This decision can be made using only two bits, one bit of the u- and the other of the v-address. A more sophisticated lookahead could use the direction of consecutive accesses within a scanline, which could be calculated from the two previous access points. The rasterizer should provide a flag to indicate a scanline change, which could be used to disable the prefetch and lookahead calculation for that cycle.

Each of the 64-bit entries in the cache holds two, 24 bit quantities of true-color data ("color a" and "color b" such as shown at 402 in FIG. 4) and a 16-bit quantity of decision data The 16-bit quantity of decision data is written to cache via line 624 from register 608, and the two 24-bit quantities of color data are written to the cache from color look-up table 612. The cache write accesses are controlled by DRAM control unit 607 via line 616. The cached is connected to color extract unit 618 via four 64-bit lines. Color extract unit 618 selects data from the four received 64-bit quantities for use by bilinear interpolator 622 in accordance with pixel center coordinates received over line 620 from DRAM control unit 607. A bilinear interpolation is performed on four neighboring texel colors by the bilinear interpolation unit 622 in accordance with the pixel center coordinates communicated from the DRAM control unit 607 via line 620. The output of the bilinear interpolation unit 622, which consists of a 24-bit quantity of color, RGB data is coupled to rasterizer 302.

The embodiment shown in FIG. 6 may be modified to perform a complete trilinear interpolation, instead of bilinear interpolation. In such an instance, the cache should be duplicated for the other level of detail, however, the interface to the DRAM can be used for both levels. The DRAM chip which, in the embodiment shown in FIG. 6 takes the form of a conventional 256K×16 or 1M×16 chip provides 2 Mtexel (8 Mtexel) of texture memory (1.5 Mtexel/6 Mtexel mipmapped). The interface between the unit 602 and the DRAM 604 requires 31 pins (16 data-, 11 address- and 4 control pins). The manner in which data is written to or read from DRAM 604 may be performed in any number of alternative ways. By way of example, the capacity of register 608 may be increased to allow pipelining of data from the DRAM 604 into the unit 602.

The visual quality of a compression scheme can in the end only be judged by human observers. Compared to original textures, still images as well as animations show noticeable but no disturbing artifacts for compressed textures. Mipmapping with bi-linear interpolation generally exhibits severe artifacts, independent of the use of image compression. Footprint assembly retains texture details even for objects looked at from a small angle. For cost-efficient systems, we propose to combine bilinear interpolation, CCC and footprint assembly, a way to improve texture mapping performance significantly.

5. Texram

Figure 8:
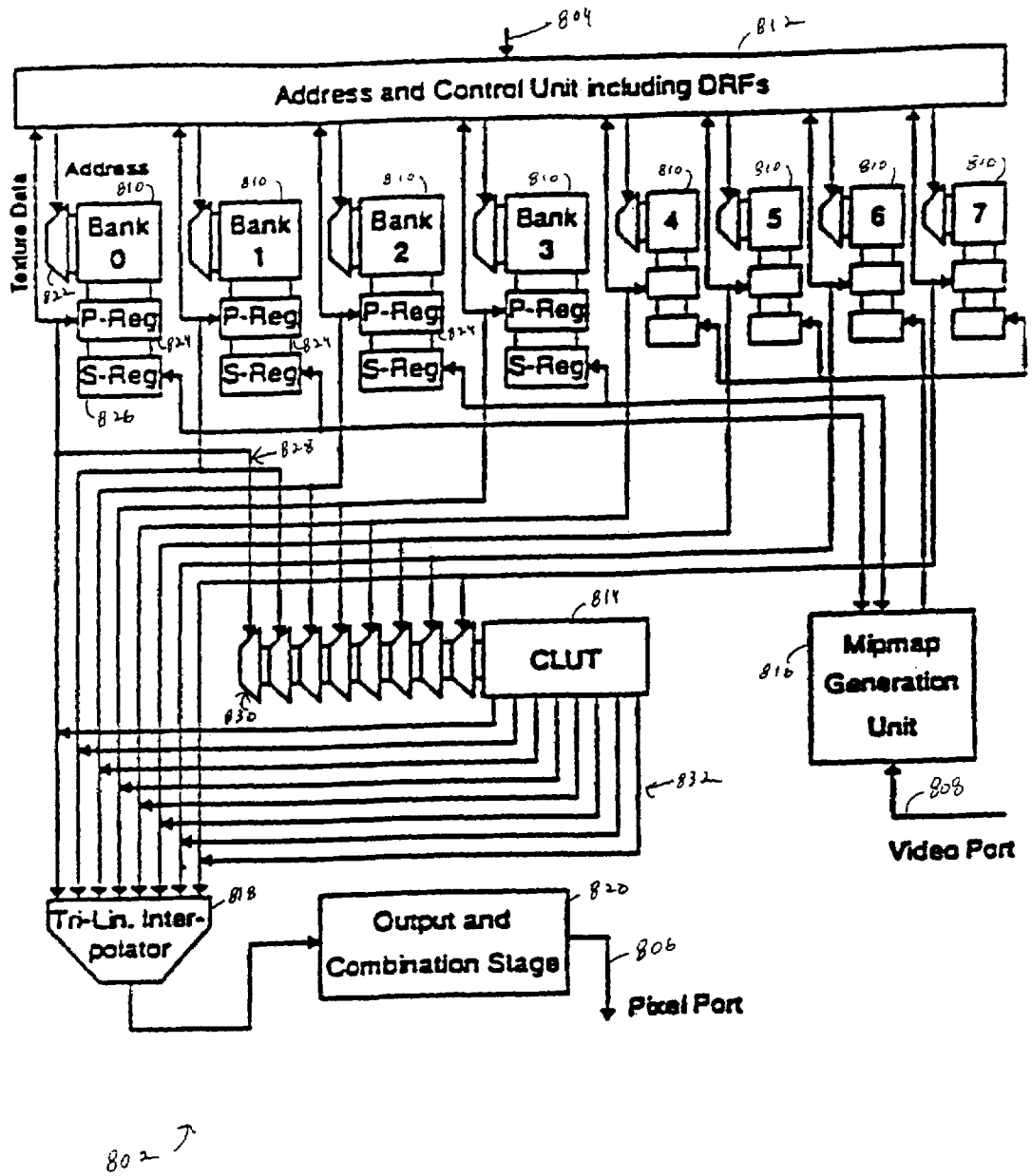
FIG. 8 is a schematic illustration of another embodiment of a texture mapping system.

FIG. 8 of the drawings illustrates an embodiment of a texture mapping system 802, referred to herein as "TEXRAM", which in a single chip provides storage for a 1024×1024 single component mipmap. The TEXRAM 802 receives texel data, texture coordinates and control information over signal line 804 from a rasterizer such as shown in FIG. 3 at 302. Output of the TEXRAM 802 is sent to rasterizer 302 over signal line shown at 806. The TEXRAM 802 also receives video input via a separate line 808.

The system 802 includes memory banks 810 (designated individually as Bank 0, 1, 2, ... 7), address and control unit 812, Color LookUp Table (CLUT) 814, mipmap generation unit 816, tri-linear interpolator 818 and output/combination stage 820. The capacity of the memory arrays 704 sum up to 11,239,424 bits, and thus, in a preferred embodiment, a 16 MBit DRAM technology is used. The memory system consists of four large arrays (Banks 0, 1, 2 and 3) of 274×8192 bits, holding the even levels of the mipmap, and four small array of 69×8192 bits (Banks 4, 5, 6 and 7) for the odd levels of the mipmap. Control unit 812 is advantageously pipelined and includes a plurality of Description Register Files (DRFs), explained below in Section 14. The control unit 812 generates all addresses and controls internal operation and the flow of data to and from a rasterizer such as shown in FIG. 3. The tri-linear interpolator 818 is designed for a 6-bit fraction of the texture coordinates.

Any random access to a DRAM array takes place in two steps: first, the addressed row (or page) must be loaded completely into a page register (row access), from where the desired data item can be accessed in a second step (column access). If the following memory cycle refers to the same row, the row access can be skipped since the data still exists in the output register (Page Mode access). To assure that most accesses are Page Mode cycles, we place the texels of rectangular regions into one page (64×64 texels in level 0).

The textures are loaded from rasterizer 302 via line 804. After specifying a start address, four texels can be written into the chip per access. Consecutive addresses are generated internally. Each memory bank 810 receives an address at address decoder 822 and data via page register (P-Reg) 824. Each memory bank 810 can also receive video data via shift register (S-Reg) 826.

Address and control unit 812 receives from a rasterizer, texture coordinates (u,v), as described above in conjunction with FIG. 3, decodes the texture coordinates to form addresses, for memory banks 810 and provides the addresses to address decoders 822. Address decoders 822 each select the appropriate locations in the corresponding memory bank 810 and the selected data is loaded in parallel into P-Reg's 824. Data from each P-Reg 824 is coupled in parallel via lines such as seen at 828 to an associated address decoder 830 of CLUT 814 and also to the input of tri-linear interpolator 818.

Address decoder 830 and CLUT 814 allow a parallel lookup of eight color values at a time. The output of CLUT 814 is coupled via lines 832 to the input of tri-linear interpolator

818. Lines 828, as mentioned above, are also coupled to the input of tri-linear interpolator 818, allowing a bypass of CLUT 814 in instances where the contents of memory banks 810 hold true color data as opposed to addresses for CLUT 814. Tri-linear interpolator performs a tri-linear interpolation and provides a color value to output and combination stage 820 which implements the functions described below in sections 6-10. The output of the stage 620 is coupled to the rasterizer 302.

Video input is received via a video port shown at 808. Mipmap generation unit 816 generates a mipmap as explained in Section 12 herein. Loading of mipmaps into the memory banks 810 is accomplished by presenting addresses and corresponding data from rasterizer 302 via address and control unit 812.

The memory banks 810 and associated address decoders 822, page registers 824 and shift registers 826 may take a conventional form as may CLUT 814, address decoders 830, and tri-linear interpolator 818. Further details of the output and combination stage 820 are provided below in sections 6-10.

Due to the pipelined architecture of the TEXRAM the performance is limited only by the memory access time. In Page Mode an access takes 30 ns, which results in a peak performance of 33M textured pixels per second. A page fault causes a delay of another 30 ns. This small value (about one fourth of conventional DRAMs) is achieved by exploiting the fact that data read from memory is not modified, and thus, the memory can be prepared for the next read access immediately after the actual one. Thus, as a rather pessimistic example, if in the average a scan line has 8 pixels and causes 2 page faults we get a sustained performance of about 27M textured pixels per second. These figures apply to luminance, index and single color mapping. The performance is about one fourth in the case we have all four color components on a single chip. For footprint assembly (described in detail in Section 10) the performance further scales down by the average number of mipmap accesses per pixel. Additionally, the number of page faults per scanline will increase.

Access to a linked map, such as described in Section 14, will most probably cause a page fault. Using a detail map in conjunction with a texture map will take about 240 ns per pixel, which results in an output rate of about 4M pixels per second. In the extreme case, linked texture and reflectance both visit their detail maps before accessing the environment map, which reduces the generation rate to about 1.8M pixels per second.

Finally, volume rendering of RGBα-data sets takes two memory accesses per resample location. Thus, in a four-chip-configuration, rendering a 64×128×128 data set takes about 70 ms assuming one resample location per volume element. Tri-linear reconstruction and gradient estimation of original data sets take eight accesses per ray point, with an increased likelihood for page faults. Simulations show an average rendering time of 0.28 s for 256×128×128 data sets in a parallel four-chip-system.

The techniques discussed so far allow us to map images on smooth surfaces. Most real objects, however, show geometrical structures such as dimples or wrinkles on their surface. Bump mapping is a technique to display such surfaces without the need to model these structures geometrically. Thus, the visual appearance of the objects is greatly enhanced without causing the number of surface elements to explode. Further aspects of this are described by A. Watt and M. Watt, "*Advanced Animation and Rendering Techniques*", Addison-Wesley, Reading, Mass., 1992, pp. 199-202.

The surface structures are generated by perturbing the surface normals according to angular deviations stored in a so-called bump map. Using these deadjusted surface normals, the illumination calculations produce reflections as if the structures would have been modeled explicitly.

Bump mapping imposes significant computing demands. An alternative approach is described below.

First: A local coordinate system $\vec{n}_1, \vec{e}_1, \vec{e}_2$ is created from the interpolated normal vector $\vec{n}_I$ issued by the rasterizer and a "main direction" $\vec{h}$. The computation of the two vectors perpendicular to $\vec{n}$ is an expensive computation, since it requires normalizations and outer products:

$$\vec{n} = \frac{\vec{n}_I}{|\vec{n}_I|} \qquad (2)$$

$$\vec{e}_1 = \frac{\vec{h} \times \vec{n}}{|\vec{h} \times \vec{n}|}$$

$$\vec{e}_2 = \vec{n} \times \vec{e}_1.$$

Second: Calculation of the new normal vector $\vec{n}_b$ from $\vec{n}$ and the map entries $b_1$ and $b_2$:

$$\vec{n}_B = \vec{n} + \vec{e}_1 b_1 + \vec{e}_2 b_2. \qquad (3)$$

Third: Calculation of the reflected view $\vec{v}_R$ vector from the unit view vector $\vec{v}$ and the new normal vector $\vec{n}_B$. The reflected view needs not to be normalized.

$$\vec{v}_R \cdot |\vec{n}|^2 = 2 \cdot \vec{n} \cdot (\vec{n} \cdot \vec{v}) - \vec{v} \cdot |\vec{n}|^2 \qquad (4)$$

Fourth: Calculation of the environment map coordinates from the reflected view vector. This is done by dividing by the largest component of the vector. The effort is comparable to the effort for the perspective correct texture coordinate generation.

A dedicated smart memory device for bump mapping, located in between the rasterizer and the TEAM, would maintain the high rendering speed since the modification of environment coordinates could then be done in parallel to texturing.

6. Texture Mapping

Basically, the TEXRAM handles 2D textures of 8-bit quantities in that it has a single tri-linear interpolator. It can be used in four different configurations:

(1) Luminance mapping: a single TEXRAM is present in the system, the texture is considered to hold grey values only.

(2) Index mapping: reducing the number of different colors of a picture is an operation called color quantization. It is used for graphics or video systems which provide only a small number of bits per pixel. Then, the pixel values do not directly represent a certain color. Instead, they are used as pointers into a color look-up-table (CLUT). This table holds a small subset of colors which best represents the colors of the original picture. For the construction of this set, a number of suitable algorithms have been developed. See, for example, W. Purgathofer et al., "*A Simple Method for Color Quantization: Octree Quantization*", in New Trends in Computer Graphics, Springer-Verlag, New York, 1988, pp. 219-231, and P. Heckbert, "*Color Image Quantization for Frame Buffer Display*, Proceedings of SIGGRAPH '82, Computer Graphics, Vol. 16, No. 3, 1982, pp. 297-307. Applied to texture mapping, the texels are used as indices into a color look-up-table, and the pixel color is obtained by post-look-up interpolation. For each pixel, eight indices are read out of the memory and passed to an on-chip color look-up-table. The CLUT has 256 entries for R, G, B and opacity α (32 bits in total) and acts as an eight-port memory. The color components are fed into the tri-linear interpolator and returned to the graphics system one at a time.

(3) True-color textures: a 2×2 texel space is assigned one RGB α-quadruple. Four accesses much be done per pixel, and the maximum texture size per chip is reduced to one fourth. Color components are again handed out sequentially.

(4) Single-color maps: treating the texture as a single color component requires to have three (RGB) or four (RGB α) devices in the system. This is the most powerful configuration, offering the maximum texture size with no degradation in speed.

Larger textures can be distributed across multiple TEXRAMs, as well as small texture patches can be replicated, i.e. tiled, over the surface of an object. For this reason a set of OpenGL compatible border operators, such as wrap around, clamp, fixed border color etc., are provided. Aspects of OpenGL are described in "*OpenGL Reference Manual*", Addison-Wesley, Reading, Mass., 1992. For a smooth replication of texture patches with distinct structure we use mirroring, i.e., the tile is mirrored around the border(s) which have been crossed.

We consider an interpolated texture value T to contribute to the diffuse portion $C_d$ of a pixel's intensity which is finally computed by $$C_d = (I_d | k_T | 1) \cdot T, \quad (5)$$

where the term in parenthesis denotes a selection of $I_d$, the shaded intensity of the pixel delivered by the rasterizer, $k_T$, a constant taken from an internal register used to modify the same texture for different objects or 1 yielding T unmodified.

7. Environment Mapping

In environment mapping, the environment of a given scene is projected onto the six faces of a unit cube, and mapped to each pixel using the reflected sight vector as pointer. Accordingly, the TEXRAM controls six environment maps, each again organized as a mipmap. Environment map coordinates and the map identifier are assumed to be generated by the rasterizer on a per-pixel basis. Mapping both texture and environment onto a surface requires two accesses to the TEXRAM. The interpolated environment intensity E is considered to be the specular reflected part of a pixel's intensity. The specular reflectance coefficient $k_s$ is taken from an internal register, and so we can extend the illumination model for computing the pixel color C to $$C = (C_d | I_d) + k_s \cdot E. \quad (6)$$

The selection says that the environment can be mapped directly onto the object as produced by the rasterizer.

8. Reflectance Mapping

Instead of using a constant specular reflectance coefficient for the entire object, a reflectance map holding $k_s(u,v)$ can be associated to a texture map. This is an efficient method to model materials like wrinkled leather, varnished wood, embossed paper and more. If using the interpolated reflectance coefficient R, the illumination model turns into $$C = (C_c | I_d) + R \cdot (E | I_s). \quad (7)$$

The last selection permits the use of any externally generated specular intensity component $I_s$.

The reflectance map is accessed at the same coordinates as the texture map. Using the map linking technique described below in Section 14, this causes no additional overhead for the rasterizer.

9. Detail Maps

Magnification at a large scale reveals the block structure of discrete pixel maps. Loading appropriate maps for each level of detail causes substantial delays in the rendering process if the magnification scale varies greatly over a single object, e.g., a long wall seen in perspective, or if the object in question moves rapidly. In most cases, however, a small set of micro-structures might be sufficient to characterize the whole texture.

Thus we introduce detail maps, which can be assigned to any texture or reflectance map. Level 0 of any map can be considered as the top-level of a detail mipmap, which in turn has the four levels $\lambda = -1, \ldots, -4$. Each texel in level 0 covers an area of 16×16 texels in level −4, and is assigned a pointer into the associated region of the detail map. By this indirection, details can be attached to texels in the most flexible way. Physically, these pointers are two 8-bit offsets which are stored separately in so-called detail offset maps. Thus, the maximum detail map size is 256×256.

Detail maps, if present, are involved whenever a negative λ is received. Texture coordinates are used to access the detail offset maps, yielding the detail region coordinates of the nearest-neighbor texel. Using these addresses, the detail mipmap is accessed and the color value is tri-linearly interpolated. The original texture map is accessed in a third step if (1) $-1 < \lambda < 0$, and thus, texels from the texture are needed for the interpolation, or (2) the pixel color from the detail map is to be modified using the texel entry to achieve an even higher realism.

Figures 9A, 9B:
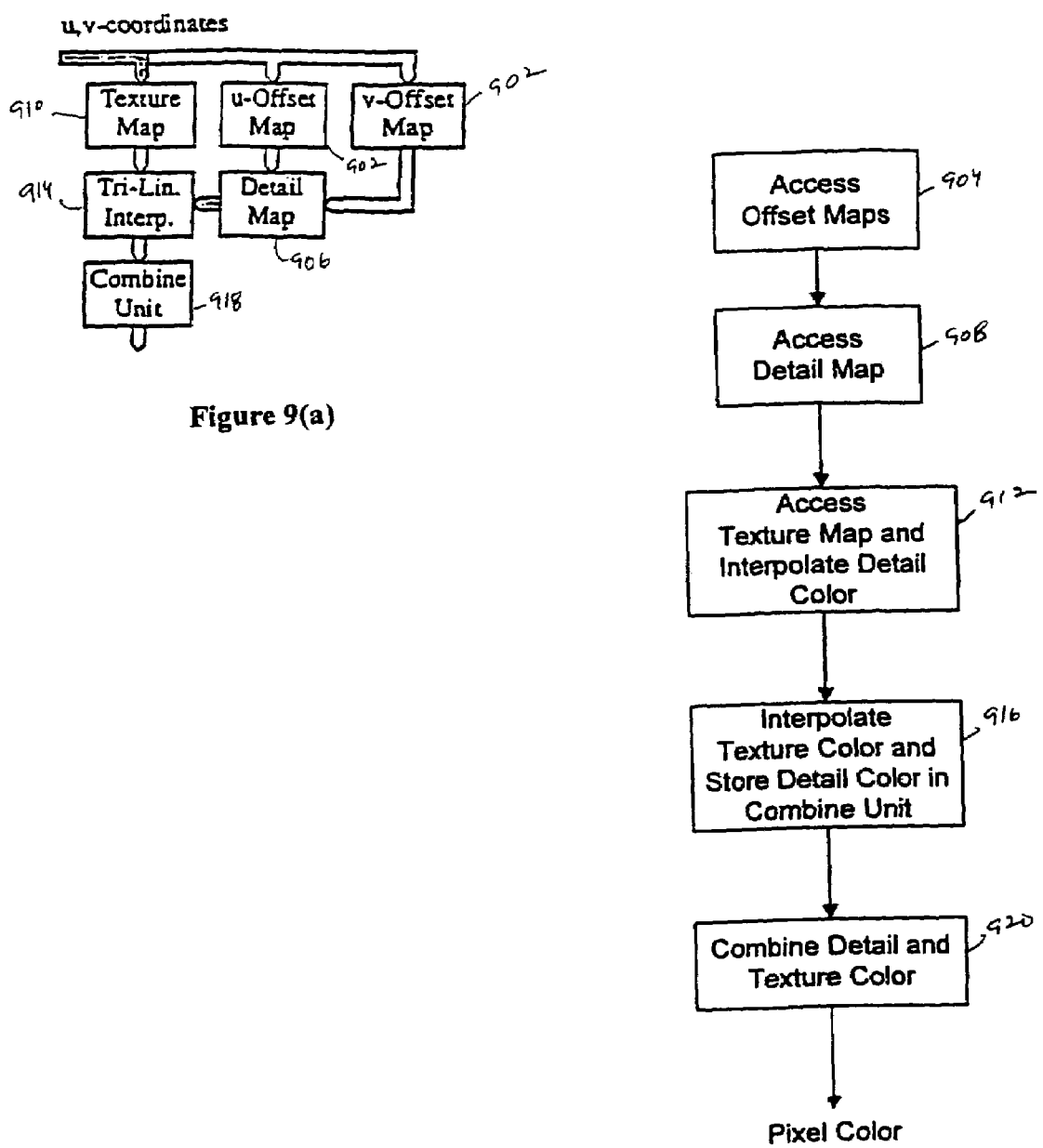
FIGS. 9(a) and 9(b) are, respectively, schematic and flow diagrams of an embodiment employing detail maps in accordance with the principles of the invention.

The simplified processing sequence is shown in FIGS. 9(*a*) and 9(*b*). FIGS. 9(*a*) and 9(*b*) in conjunction show that first, u,v offset maps 902 are accessed (step 904) and then detail map 906 is accessed (step 908). Texture map 910 is then accessed and trilinear interpolator 914 interpolates detail color in accordance with output of the detail map 906 (step 912). Tri-linear interpolator 914 then interpolates texture color in accordance with output of texture map 910 and stores detail color in combine unit 918 (step 916). Combine unit 918 then combines detail and texture color (step 920) to generate a pixel color which is sent to the rasterizer.

Figure 11A:
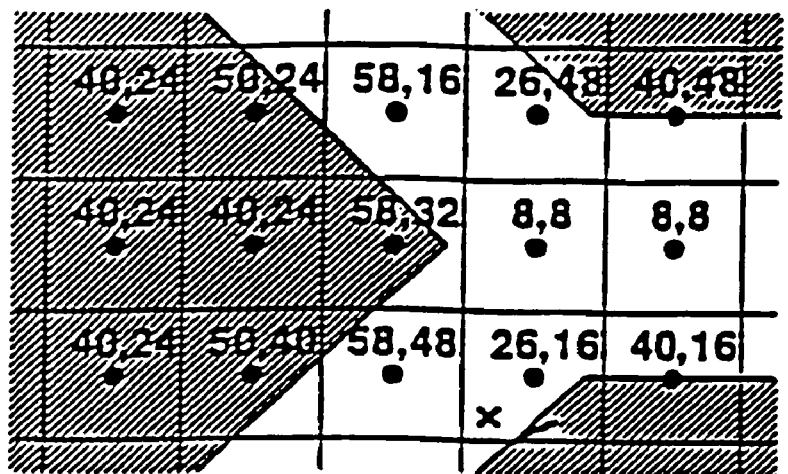
FIGS. 11(a) and 11(b) illustrate further details of the image of FIG. 10.
Figure 11B:
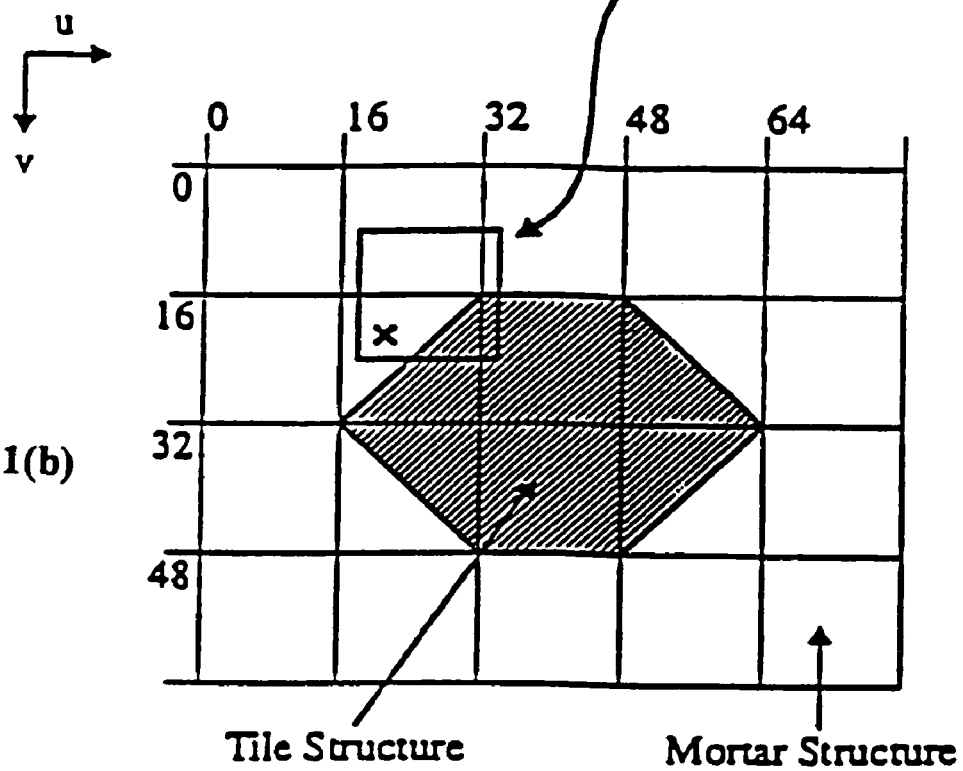

As an example let's consider a texture of ceramic tiles 1002 and mortar joints 1004 as shown in FIG. 10. As in reality, the tiles may differ slightly in color, but there might be only two micro-structures needed to magnify the texture. Thus, the detail map needs only structures for ceramic tiles, mortar and borders of the two materials. In FIG. 11(*a*), a magnified view of level 0 of the texture is shown, together with the detail map offsets assigned to each texel. The true shape of the tile structure is drawn (hatched) underneath the grid structure of the texels in level 0. FIG. 11(*b*) shows the entire detail map, having 80×64 entries in level −4. To get the coordinates of the resample location (shown as a cross in FIGS. 11(*a*) and 11(*b*))

in the detail map, the fractions of u and v are multiplied by 16, sign-extended and added to the entries in the detail offset maps. The remaining fractional bits are used for tri-linear interpolation.

Thus, the detail map can be considered as a "pattern collection", from which in the ideal case the complete magnified texture can be constructed by only translations. By the indirection of detail map coordinates, irregular textures can be magnified without causing a coarse staircase structure on the screen.

The detail texture block selection as well as the assignment of the blocks to the texels for a particular image can be done manually or automatically by suitable algorithms from texture analysis.

The TEXRAM 802 takes the original texture color into account by computing $$C = (k_a + (1-k_a) \cdot T) \cdot D, \tag{8}$$

where D is the interpolated detail map color and $k_a$ is taken from an internal register. In this way it is possible to modify the detail color with the color of the overlying texel thus to use the same detail map for differently colored regions of the texture.

Since offset maps have no lower resolution maps associated with them, the detail maps can in most cases be stored instead of the low-resolution mip-map levels of the offset maps for an efficient usage of memory resources.

10. Footprint Assembly

As a novel way of mapping textures onto surfaces we introduce footprint assembly, the approximation of the projection of the pixel on the texture by a number N of square mipmapped texels. $N = 2^m$ for practical reasons, so the texels can be summed up and shifted right m places to give the final texture color. The sequence of coordinates is generated internally, so that this kind of texturing is still very fast for a reasonable m. To avoid unacceptable computing times, however, the user can defined an upper limit for m. Footprint assembly improves the image quality in tertiary systems that are based on mipmapping without needing significantly more hardware.

Figure 12:
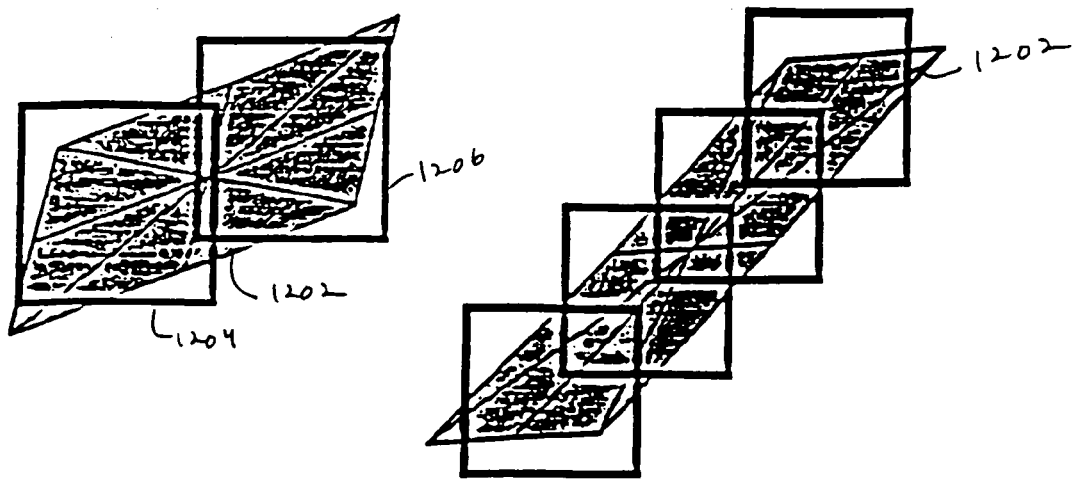
FIG. 12 illustrates an approximation of the projection of a pixel on a texture map using a sequence of mipmap operations.

FIG. 12 shows how the projection of a pixel 1202 (assumed to be a parallelogram) on a texture map is approximated by a sequence of mipmap accesses 1204 and 1206. Footprint assembly requires only small additional hardware. The sequence of texture coordinates is generated internally to the texture mapping unit (such as described in Sections 4 or 5 above), so that this kind of texturing is still very fast for a reasonable m. To avoid unacceptable computing times the user can set an upper limit form.

Figure 13:
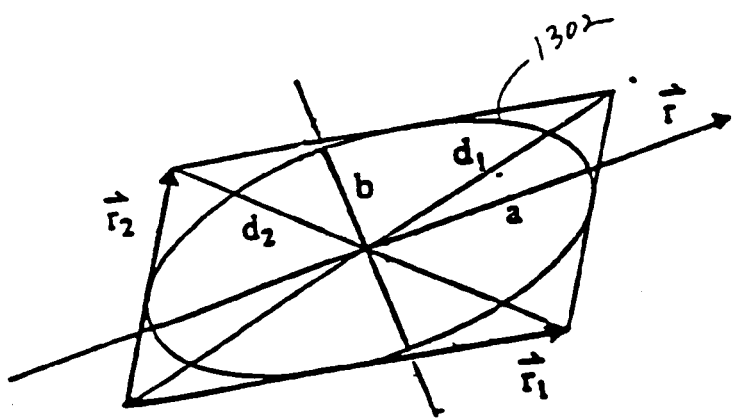
FIG. 13 illustrates details of various aspects of determination of a pixel footprint.

We neglect the perspective deformation of a pixel's footprint on the texture and consider as the general case a parallelogram given by $$\vec{r}_1 = \begin{vmatrix} \frac{\partial u}{\partial x} \\ \frac{\partial v}{\partial x} \end{vmatrix} \text{ and } \vec{r}_2 = \begin{vmatrix} \frac{\partial u}{\partial y} \\ \frac{\partial v}{\partial y} \end{vmatrix} \tag{9}$$

where u,v are the texture coordinates and x,y are the screen addresses of the pixel The pixel center $\vec{p}$ in the texture map is the intersection point of the diagonals, and we want to find the direction $\vec{r}$ in which to step from the pixel center to best approximate the footprint. Ideally, this is given by the main axis a of the ellipse 1302 as shown in FIG. 13. However, the computational expenses for finding the ideal direction, as explained below, are too high for real-time operation.

The direction of the main axis of the ellipse inside the footprint of a pixel, as shown in FIG. 13 may be found in the following manner. The derivative of the coordinate transformation from pixel space into texture space is defined by $$\vec{r}_1 = M \cdot \vec{e}_x = \dot{M} \cdot \begin{bmatrix} 1 \\ 0 \end{bmatrix} \tag{10}$$

$$\vec{r}_2 = M \cdot \vec{e}_y = M \cdot \begin{bmatrix} 0 \\ 1 \end{bmatrix}$$

and thus, $$M = [\vec{r}_1 \ \vec{r}_2]. \tag{11}$$

The ellipse is defined by:

$$\vec{x}^T (M^{-1})^T M^{-1} \vec{x} = 1. \tag{12}$$

$(M^{-1})^T M^{-1}$ is symmetrical and can be diagonalized:

$$(M^{-1})^T M^{-1} = R \begin{bmatrix} \frac{1}{a^2} & 0 \\ - & - \\ 0 & \frac{1}{b^2} \end{bmatrix} \cdot R^{-1} = N. \tag{13}$$

Its eigenvectors $$\vec{v}_1 = R \cdot \begin{bmatrix} 1 \\ 0 \end{bmatrix} \text{ and } \vec{v}_2 = R \cdot \begin{bmatrix} 0 \\ 1 \end{bmatrix} \tag{14}$$

give the directions of the main axes of the ellipse. N has the eigenvalues $$\lambda_1 = \frac{1}{a^2} \text{ and } \lambda_2 = \frac{1}{b^2}. \tag{15}$$

We can save the calculation of $M^{-1}$ if we use $M^{-1}$ det (M) instead, which can be derived from M by reordering the matrix coefficients without division.

$$N' = N det(M)^2 \tag{16}$$

has the same eigenvectors as N:

$$\vec{v}_1' = \vec{v}_1 \text{ and } \vec{v}_2' = \vec{v}_2, \tag{17}$$

with the eigenvalues $$\lambda_1' = b^2 \text{ and } \lambda_2' = a^2. \tag{18}$$

The main axis of the ellipse, which we are looking for, has the direction of the eigenvector with the smaller eigenvalue.

The computational expenses for finding the ideal direction, as explained above, are too high for real-time operation. Thus, we propose to use the larger of $\vec{r}_1$ and $\vec{r}_2$ as marching direction $\vec{r}$, $$q = \min(|\vec{r}_1|, |\vec{r}_2|, d_1, d_2) \quad (19)$$

as edge length and $$N = \frac{\max(|\vec{r}_1|, |\vec{r}_2|)}{q}, \quad (20)$$

rounded to the nearest power of two as the number of square mipmapped texture elements for the footprint. A difference vector $\Delta \vec{r} = (\Delta u, \Delta v)$ is constructed according to:

$$\Delta u = \frac{r_u}{N} \text{ and } \Delta v = \frac{r_v}{N}. \quad (21)$$

A sequence of sample points $p_n$ is generated by $$\vec{p}_n = \vec{p} + \frac{n}{2} \cdot \Delta \vec{r}, \text{ where } n = \pm 1, \pm 3, \pm 5 \ldots. \quad (22)$$

Two examples are shown in FIG. 12, where the gray shaded areas are in the pixel projections (footprints), which are approximated by two or four squares, respectively. In both cases, the edge length q of the squares is equal to the length of the shorter edge of the corresponding parallelogram. The marching direction $\vec{r}$ corresponds to the longer edge of the associated parallelogram. Thus, for using this mode, the rasterizer transfers u,v and λ during the first, and λ $\vec{r}$ =(Δu, Δv) and N during a second access to the TEXRAM. The TEXRAM autonomously generates N sample locations, and returns the averaged pixel color after a certain time to the rasterizer. The advantage of this method is twofold: (1) the rasterizer can perform the above calculations sequentially using its hardware units for perspective texture mapping multiple times, while (2) the TEXRAM assembles the previous pixel.

11. Video Mapping

Modeling natural phenomena like fire or a water surface in real-time or providing a realistic background scene like a view from a window on a busy street can be considered completely impossible using a surface-approximation approach. On the other side, since it does not matter what particular scene we see and no interaction is intended, we can conveniently take image sequences captured by a camera and recorded on tape. Basically, video mapping differs from texture mapping in two points: (1) the map changes dynamically at a high rate and therefore, (2) the mipmap must be generated on the fly.

The first point further implies that we have to provide a separate serial pixel port (such as shown at 808 in FIG. 8), through which the continuous stream of video data can enter the TEXRAM without slowing down the accesses of the rasterizer. For the same reason, the mipmap generation must be done by dedicated arithmetic units. The integration of video data opens up the wide field of multimedia applications, such as real-time zooming or rotating, image warping and image morphing.

12. Real-Time Mipmap Generation

Real-time mipmap generation is compulsory for video mapping, but is useful for any texture map. We use a 2×2 box filter for this purpose. For video mapping we have to consider that in most cases the video source delivers interlaced images. Thus, if the actual frame consists of odd screen lines, we have to read out the corresponding even line from the memory array to compute a line in level 1. Entries in level λ are computed as soon as all needed entries in level λ−1 are available, and stored in small FIFO memories from where they are passed to shift registers 826 connected to the page registers 824 of the memory banks 810 (see section 5). Thus, shortly after the last texel of level 0 was received, the generation of the mipmap is completed.

Figure 14A:
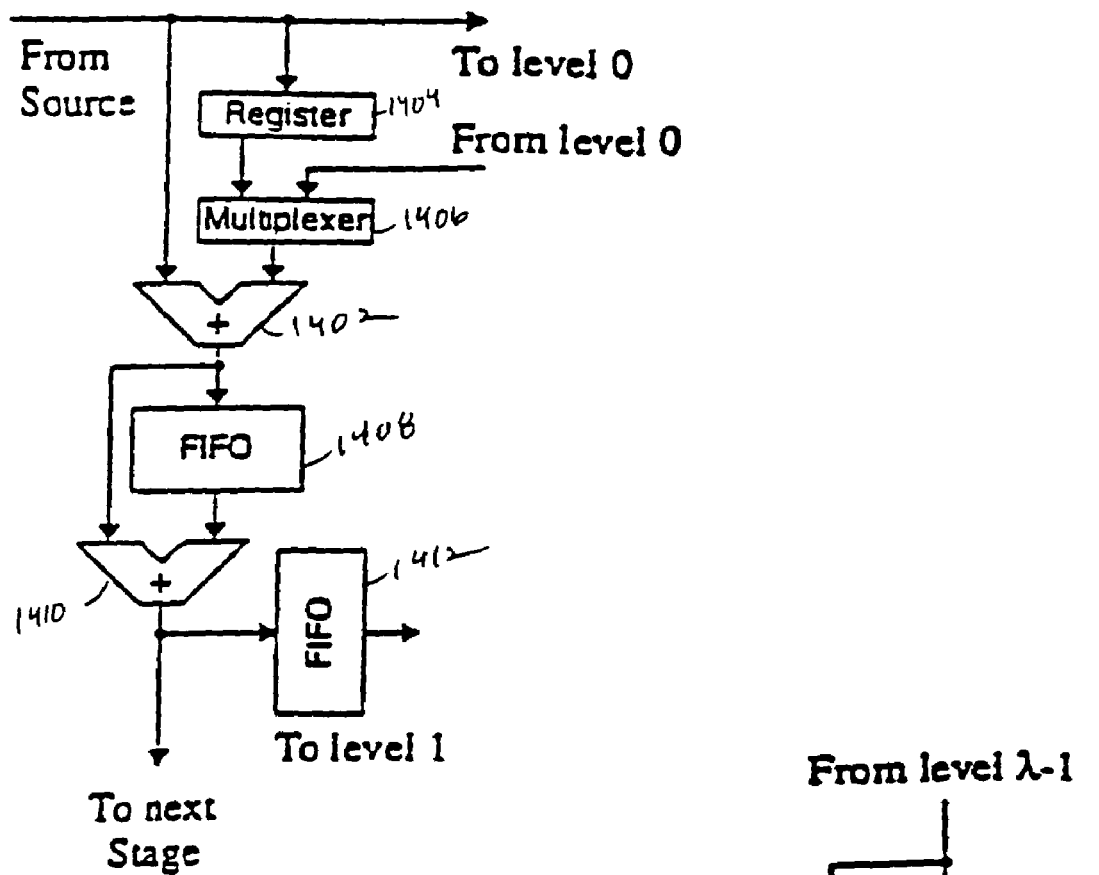
FIGS. 14(a) and 14(b) illustrate an embodiment of circuitry of real-time mipmap generation.
Figure 14B:
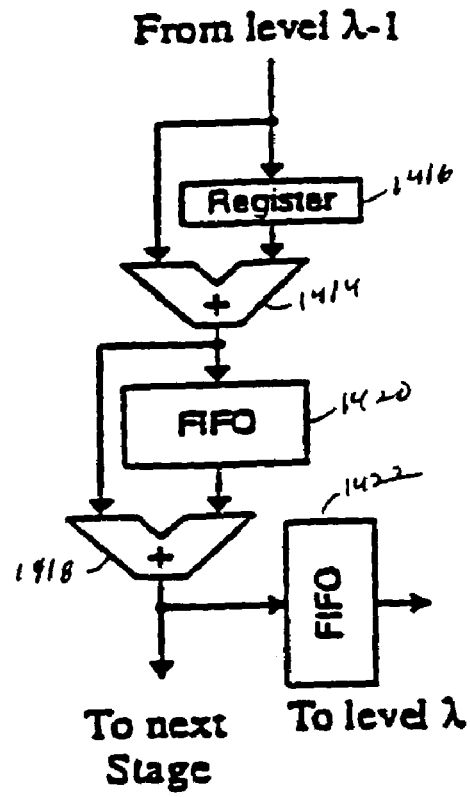

FIGS. 14(a) and 14(b) show a preferred embodiment of circuitry for implementing mipmap generation unit 816 of FIG. 8. FIG. 14(a) shows an embodiment of circuitry for computing level 1 from both interlaced and non-interlaced sources. For interlaced video, the mode of operation can be described as follows. The texels are written into the memory banks 810 as they arrive from the source, and, in parallel, they are processed in the circuitry of FIG. 14(a). The line, which corresponds to the arriving line has been loaded into the shift registers 826, from where the texels are passed to the adder 1402 via multiplexer 1406. In adder 1402, two texels belonging to neighboring lines but same columns are added. In the case of even columns the result is written into FIFO 1408, from where it is passed to adder 1410 in the next clock cycle, and added to the result of an odd column to form the final level-1 entry. FIFO 1408 has the function of a single-entry register in this mode. The texels for level 1 are passed to the next stage, shown in FIG. 14(b), and at the same time they are written into FIFO 1412, from where they are written into the shift registers 826 after completion of a line.

In the non-interlaced video mode, adder 1402 adds two values from neighboring texels of the same line. For this purpose, texels from even columns are stored in register 1404 for one clock cycle. In the case of even lines, the results of the addition are written into FIFO 1408, which in this mode has the function of a line buffer. The intermediate results of odd lines bypass FIFO 1408 and are added in adder 1410 to the results stored in FIFO 1408.

The calculations for the higher levels are done in a similar way in the circuitry shown in FIG. 14(b). As a consequence of the above considerations, the depth of FIFO 1408 and FIFO 1412 is defined by one half of the number of texels in one line of level 0. The FIFO depth is reduced by one half from one level to the next.

13. Volume Rendering

Using the memory arrays and the hardware units for footprint assembly and mipmapping differently, the TEXRAM turns into a complete ray-casting machine for volume rendering, which can generate evenly spaced resample locations along an arbitrarily oriented viewing ray, read the eight neighboring voxels by two consecutive accesses and tri-linearly interpolate the function value at each resample point. In such an instance, only the four larger memory arrays in the TEXRAM holding level 0 are used for volume rendering.

Using pre-shaded and pre-classified data sets (i.e., data sets containing RGBα), the remaining step for the visualization is just a-blending, which can easily be done by the host or by one or more digital signal processors (DSPs) for real-time operation.

Figure 15:
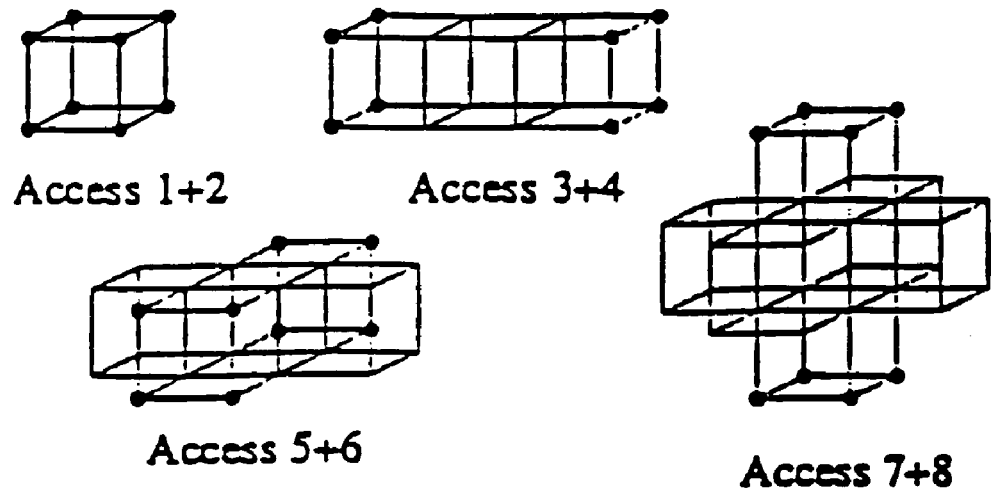
FIG. 15 is a schematic illustration of data accesses employed in a volume rendering embodiment.

In a four-chip (TEXRAM)-configuration, RGBα-datasets can have up to 1M samples. For a more flexible visualization or interactive segmentation, the chip can operate on the original samples, and return the interpolated function value and the local gradient for each resample location. In this mode, eight accesses are performed for each resample location as shown in FIG. 15. After accesses 1 and 2, all data is available for tri-linearly interpolating the function value. Accesses 3 and 4 yield all additional values needed to compute the x-components of the gradient at the original sample locations. These quantities are then fed into the tri-linear interpolator to give the local x-gradient at the resample location. The y- and z-components are computed in just the same way after accesses 5 through 8 have been done. The special address interleaving scheme assures that each access is non-conflicting, i.e., all four associated voxels can be read out in parallel. In a four-chip-configuration, original data sets can be as large as 256×128×128 8-bit voxels.

14. Map Linking

Figure 16:
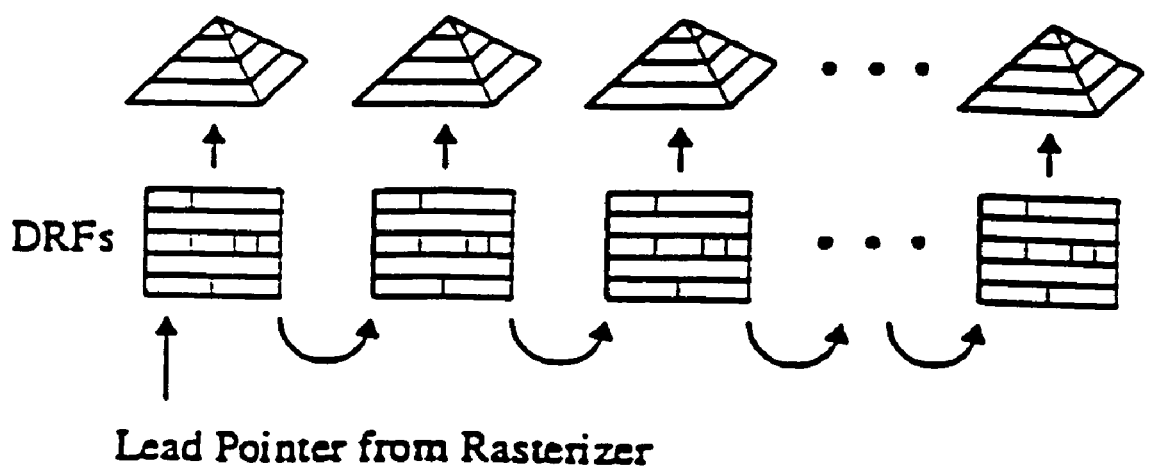
FIG. 16 is a schematic illustration of map linking.

To handle the up to seven maps involved in coloring a single pixel we use a linked list of map description register files (DRF), such as illustrated in FIG. 16. In the general case, a texture can be linked to the u,v-offset map finally pointing to the texture detail map. This map in turn points to a reflectance map linked to offset and detail maps followed by the environment map. Even a video map can be linked to an environment map to model, for example, a TV screen reflecting a light source.

Thus, there are preferably seven DRFs in the address and control unit 812 of the TEXRAM. Each DRF holds the physical offset of the map on the memory array, its size and type, links, border operation and border color, information about whether or not new texel coordinates are to be received prior to an access and various constants for the evaluation of the illumination equation as explained in sections 6 through 9. DRF number 7 is special in that it holds six offsets and sizes for the environment map.

Thus, the set of DRFs can be considered as a micro-program storage. The rasterizer transmits the pointer to the leading DRF along with each pixel, and the TEXRAM proceeds down the chain until a new parameter is needed or the pixel is finished.

It is to be understood that mechanisms and techniques which have been described are merely illustrative of certain preferred embodiments. Numerous modifications may be made to the methods and apparatus described without departing from the true spirit and scope of the invention.

What is claimed is:

1. A method in a computer system for adding detail to a texture map comprising at least one texture element, the method comprising:
   generating, in the computer system, a detail map;
   assigning, in the computer system, a pointer into the detail map to the at least one texture element of the texture map to generate a pointer map, the pointer comprising two offsets;
   determining, in the computer system, a texture address and a level of detail;
   retrieving, in the computer system, offsets from the pointer map when detail is indicated as needed by the level of detail;
   using, in the computer system, the offsets as detail map addresses;
   accessing, in the computer system, the detail map;
   interpolating, in the computer system, results of the detail map accessing when multiple accesses are performed; and
   generating, in the computer system, at least one final pixel color by mapping the texture map and the detail map to a surface of a computer-generated object.

2. The method of claim 1, wherein the detail map is organized as a mip-map.

3. The method of claim 1, wherein the at least one final pixel color is a combination of the results of the detail map access operation and a texture map access operation, the texture map access operation comprising at least one access to the texture map.

4. The method of claim 3, wherein at least one of the texture map access operation and the detail map access operation is carried out in real time using dedicated arithmetic units.

5. The method of claim 3, wherein at least one of an environment mapping and a reflectance mapping is carried out in real time using dedicated arithmetic units.

\* \* \* \* \*